United States Patent [19]

Inoshita et al.

[11] Patent Number: 4,558,412
[45] Date of Patent: Dec. 10, 1985

[54] DIRECT MEMORY ACCESS REVOLVING PRIORITY APPARATUS

[75] Inventors: Minoru Inoshita, Glendale, Ariz.; Gerald N. Winfrey, Billerica, Mass.

[73] Assignee: Honeywell Information Systems Inc., Waltham, Mass.

[21] Appl. No.: 557,379

[22] Filed: Dec. 1, 1983

Related U.S. Application Data

[63] Continuation of Ser. No. 318,097, Nov. 4, 1981, abandoned, which is a continuation of Ser. No. 973,196, Dec. 26, 1978, abandoned.

[51] Int. Cl.⁴ .......................... G06F 13/00; G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,689,887 | 9/1972 | La Falce et al. | 340/825.11 |
| 3,752,932 | 8/1973 | Frisone | 364/900 |
| 3,766,530 | 10/1973 | Ito | 364/200 |
| 3,810,114 | 5/1974 | Yamada et al. | 364/200 |
| 3,983,540 | 9/1976 | Keller et al. | 364/200 |
| 3,993,981 | 11/1976 | Cassarino, Jr. | 364/200 |
| 4,009,470 | 2/1977 | Danilenko et al. | 364/200 |
| 4,016,548 | 4/1977 | Law et al. | 364/200 |
| 4,034,347 | 7/1977 | Probert, Jr. | 364/200 |
| 4,059,851 | 11/1977 | Nutter, Jr. | 364/200 |
| 4,067,059 | 1/1978 | Derchak | 364/200 |
| 4,075,691 | 2/1978 | Davis et al. | 364/200 |
| 4,096,572 | 6/1978 | Namimoto | 364/200 |
| 4,099,233 | 7/1978 | Barbagelata | 364/200 |
| 4,121,285 | 10/1978 | Chen | 364/200 |
| 4,181,938 | 1/1980 | Suzuki et al. | 364/200 |

OTHER PUBLICATIONS

Gschwind, "Design of Digital Computer", Springer-Verlag, 1975, pp. 168-171.

Primary Examiner—James D. Thomas
Assistant Examiner—David Y. Eng
Attorney, Agent, or Firm—George Grayson; John S. Solakian

[57] ABSTRACT

In a terminal system comprising a central processor subsystem, a memory subsystem and a plurality of peripheral subsystems, all connected in common to a system bus, the system bus timing is divided into a plurality of fixed times including a central processor (CPU) bus cycle and a plurality of Direct Memory Access (DMA) bus cycles. The central processor subsystem communicates with the memory subsystem during CPU bus cycles and the peripheral subsystems communicate with the memory subsystem on DMA bus cycles.

Particular peripheral subsystems are assigned to particular DMA channels. These DMA channels communicate with the memory subsystem on particular DMA bus cycles which are operative in a revolving priority, with the first DMA bus cycle occuring after the last DMA bus cycle of the previous sequence of DMA bus cycles.

A plurality of peripheral subsystems are wired to a particular DMA channel in a daisy chain fashion with the peripheral subsystem wired closest to the system bus having top priority. The peripheral subsystem having top priority may be wired either to relinquish the assigned DMA bus cycle after communicating with memory or "hog" the assigned DMA bus cycle.

6 Claims, 4 Drawing Figures

FIG. 3 OPTION "N" 22a

DIRECT MEMORY ACCESS REVOLVING PRIORITY APPARATUS

This is a continuation of U.S. patent application Ser. No. 318,097 filed on Nov. 4, 1981, now abandoned, which was a continuation of U.S. patent application Ser. No. 973,196, filed Dec. 26, 1978, now abandoned.

RELATED APPLICATIONS

The following application filed on even date and assigned to the same assignee is hereby incorporated by reference: U.S. Pat. No. 4,263,648 which issued Apr. 21, 1981, entitled "Split System Bus Cycle for Direct Memory Access of Peripherals in a Cathode Ray Tube Display System", inventors—John P. Stafford, Richard A. Slater, Gerald Winfrey, Frederick E. Kobs and Joseph L. Ryan.

BACKGROUND OF THE INVENTION

1. Field of the Invention

This invention relates generally to terminal systems and more particularly to display systems with apparatus for generating a Direct Memory Access priority system.

2. Description of the Prior Art

Terminal systems having a central processor (CPU), a memory subsystem and a number of peripherals are well-known. One method of controlling the system is by having the CPU, under program operation, control the peripheral input/output communication with memory through the CPU. This type of operation is satisfactory for low speed peripheral or for dedicated applications. This type of operation is not satisfactory for peripherals with high speed input/output requirements with memory.

To solve this problem, the prior art had designed systems whereby the high performance peripherals communicated with memory without the intervention of the CPU. The CPU communicated with memory on CPU cycles and the peripherals communicated with memory during Direct Memory Access (DMA) cycles with the peripherals stealing CPU cycles to communicate with memory. This system had the disadvantage of reducing system throughput in an application whereby the high performance peripheral prevented CPU cycles.

To solve this problem, systems with dedicated CPU channels and DMA channels were designed. This had the problem that peripheral I/O throughput could be reduced by having high priority peripherals hogging the DMA cycles thereby preventing low priority peripherals from accessing memory. This problem is somewhat alleviated by the invention of U.S. Pat. No. 3,553,656 by D. E. Bernhardt, entitled "Selector for the Dynamic Assignment of a Priority on a Periodic Basis," wherein user devices are selectively assigned highest priority depending upon the last device granted access. This, however, still has the problem of the device assigned highest priority hogging the memory bus.

These problems were eased somewhat by the system described in an article from Computer Design, January, 1978, pages 117-124, by Joseph Nissam, entitled "DMA Controller Capitalizes on Clock Cycles to Bypass CPU". A system is described having CPU cycles and DMA cycles. CPU cycles are stolen by the DMA devices; however, the CPU can interrupt the DMA cycle. Also, a DMA controller has eight DMA request/acknowledge lines to provide bidirectional control between the peripherals and the DMA controller. Each DMA line has a fixed priority. Each channel has a register to store the data length of the peripheral accessing the channel. The device relinquishes the channel when (a) the register has counted down to zero, (b) a request from a peripheral on a higher priority channel is received by the DMA controller, or (c) the CPU requests a CPU cycle.

This solution requires considerable DMA logic and "housekeeping", and retains some of the reduced throughput problems of the CPU cycle stealing systems discussed above and still has the problem of high priority peripherals hogging the bus.

OBJECTS OF THE INVENTION

Accordingly, it is an object of this invention to provide a terminal system with improved throughput.

It is another object of this invention to provide apparatus for a Direct Memory Access revolving priority system.

It is still another object of this invention to provide apparatus for a priority system for peripheral subsystems operative during one Direct Memory Access bus cycle.

It is still another object of this invention to provide apparatus for a priority system whereby a predetermined peripheral subsystem may "hog" a particular Direct Memory Access bus cycle.

It is still another object of this invention to provide apparatus for a priority system whereby the peripheral subsystem connected closest to the system bus has top priority.

SUMMARY OF THE INVENTION

These objects are accomplished in a preferred embodiment of the invention. A central processor subsystem, a memory subsystem and a plurality of peripheral subsystems are all connected in common to a system bus. The memory is available to the central processor subsystem and to the peripheral subsystems on alternate bus cycles. The central processor subsystem is operative with memory during Central Processor Unit (CPU) system bus cycles and the peripheral subsystems are operative with memory during Direct Memory Access (DMA) system bus cycles. The successive DMA buc cycles, DMA1, DMA2, DMA3, . . . DMAn, DMA1, DMA2 . . . are assigned specifically for peripheral subsystems. The preferred embodiment has 4 DMA bus cycles. The cathode ray tube display is wired to be operative during the DMA1 bus cycle. The remainder of the peripheral subsystems are selectively wired to be operative on bus cycles DMA2, DMA3 or DMA4.

A plurality of peripheral subsystems assigned to a particular DMA bus cycle, for example DMA2, have their priority logic wired in a daisy chain fashion.

A terminal system with the revolving DMA channel can be configured to give a balanced peripheral subsystem memory subsystem throughput. A device requiring a large amount of data from the memory subsystem may have the exclusive use of a DMA channel. In the preferred embodiment, the cathode ray tube has the exclusive use of the DMA1 bus cycle.

Some examples of other configurations are as follows. Two peripheral subsystems may be wired in a daisy chain fashion to the DMA2 channel and have, if required, alternate access to the DMA2 bus cycle.

A plurality of peripheral subsystems may be wired in a daisy chain fashion to the DMA3 channel with the peripheral subsystem closest to the system bus having top priority and the peripheral subsystem at the other end of the daisy chain having lowest priority in access to the DMA3 bus cycle.

As a final example, a high performance peripheral subsystem may be connected in daisy chain fashion to the DMA4 system bus with a plurality of very low performance peripheral subsystems. The high performance peripheral may be wired to hog the DMA4 bus cycle since it may operate in a burst mode. The activity would not be so great as to prevent the lower performance peripheral subsystem's access to the DMA4 bus cycle.

The system bus includes an address bus, a data bus and a control bus. The control bus includes signal lines associated with each DMA cycle. Each peripheral subsystem is operative during a selected DMA cycle by being connected to a particular control bus signal line identifying that DMA cycle. In one mode of operation, logic in each peripheral subsystem requests the DMA cycle if (a) another peripheral wired to this DMA channel has not requested this DMA cycle, (b) there is not a DMA bus acknowledge signal, and (c) the previous request by this peripheral is completed. This assures that another peripheral subsystem wired to this DMA channel and requesting the DMA channel will be operative the next cycle in which this DMA channel is active.

In a second mode of operation, logic on some peripheral subsystems associated with a particular DMA channel are wired in such a manner that a particular peripheral subsystem wired in that manner requesting the DMA channel and being operative with that DMA channel may remain connected to that DMA channel on successive DMA cycles of that particular channel even though other peripheral subsystems connected to that DMA channel desire access to the channel. In this case, the logic is wired in such a manner that a request for access by the particular peripheral subsystem on the DMA cycles is accepted each time the request is made by that peripheral subsystem. This allows a peripheral subsystem to "hog" that DMA channel for as long as required. A peripheral subsystem operating in a burst mode may have this hogging requirement.

DESCRIPTION OF THE PREFERRED EMBODIMENT

Figure 1:
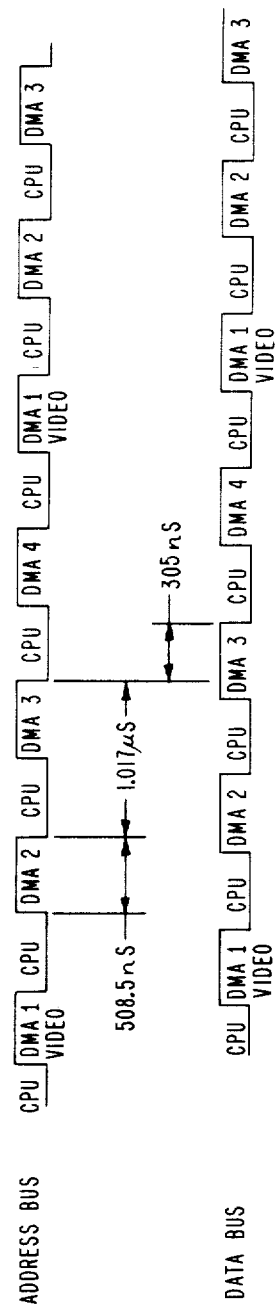
FIG. 1 shows the system bus timing cycles.

FIG. 1 shows the system bus timing cycle with the data bus 16 offset from the address bus by 305 nanoseconds. This split bus timing is disclosed in the incorporated application which issued as U.S. Pat. No. 4,263,648.

The DMA1 time slot is reversed for the cathode ray tube display. Peripheral subsystems are assigned to the DMA2, DMA3 and DMA4 time slots. The system bus is available to the microprocessor on CPU cycles.

Figure 2:
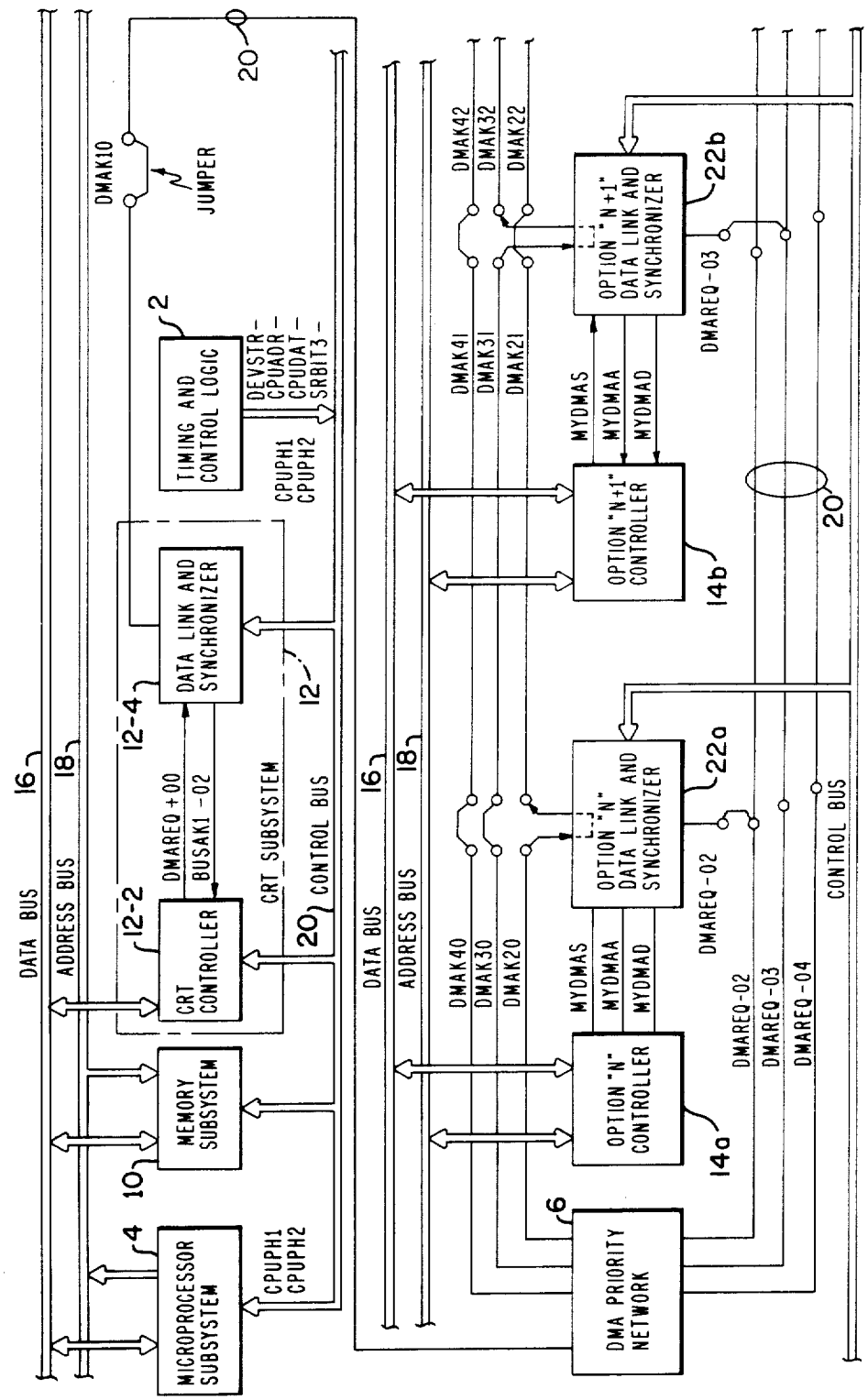
FIG. 2 is a block diagram of the system.

FIG. 2 is a block diagram of a portion of the overall terminal system comprising a microprocessor subsystem 4, a memory subsystem 10, a CRT subsystem 12 including a CRT controller 12-2 and a DMA link and synchroniser 12-4, timing and control logic 2, a DMA priority network 6, option controllers 14a, 14b, ... and option data link and synchronizer 22a, 22b, ... The data bus 16, the address bus 18 and a control bus 20 are operatively connected to the above subsystems as shown in FIG. 2.

The timing and control logic 2 generates the CPUADR— and CPUDAT— bus timing signals which define the DMA and CPU cycle timings of address bus 18 and data bus 16, respectively.

The DMA priority network 6 generates the sequential DMAK10, DMAK20, DMAK30 and DMAK40 timing signals. Timing signal DMAK10 defines the DMA1 address bus 18 and data bus 16 cycle times. Similarly timing signal DMAK20 defines DMA2 cycle times, and timing signal DMAK40 defines DMA4 cycle times.

An option is jumpered serially into one of the timing signal lines to be operative during that DMA cycle. In FIG. 2, option "N" is jumpered serially into timing signal DMAK20 and is operative during the DMA2 address bus 18 and data bus 16 cycle times. Other options (not shown) that would be operative during DMA2 cycle time would be jumpered serially into the continuation of signal line DMAK20, signal lines DMAK21, DMAK22, etc.

Other options would be jumpered serially into the timing signal chain DMAK30, DMAK31, DMAK32, etc., to be operative at DMA3 time or jumpered serially into the timing signal chain DMAK40, DMAK41, DMAK42, etc., to be operative at DMA4 time.

CRT subsystem 12 is jumpered to timing signal line DMAK10 and is operative at DMA1 time. Since the CRT subsystem requires continuous rewriting, the DMA1 time slot is assigned exclusively to the CRT.

The options 22a and 22b are operative during time DMA2, DMA3 or DMA4 by being jumpered to signal lines DMAREQ−1, DMAREQ−2 or DMAREQ−3, respectively. One of these lines low indicates that one of the options in that daisy chain is requesting access to its DMA cycle and prevents the other options in that daisy chain from gaining access to that DMA cycle. FIG. 2 shows option "N" 22a jumpered to signal line DMAREQ−2 and option "N+1"22b jumpered to signal line DMAREQ−3.

When logic signal DMAREQ+00, an output of CRT controller 12-2, is high, it requests access to the DMA1 cycle by its input to data link and synchronizer 12-4. Logic signal BUSAK1−02 is output to data link 12-4 and, when it is high it acknowledges access to the DMA1 cycle by its input to CRT controller 12-2.

Each option or device operatively connected to the bus during its DMA cycle either transfers data to or receives data from the memory subsystem over data bus 16 at an address specified by the option or device and sent to memory 10 over address bus 18. Microprocessor subsystem 4 is operative with memory 10 during CPU bus cycles. The CPUPH1 and CPUPH2 timing signals are generated by timing and control logic 2 and time the microprocessor subsystem 4 to the address bus 18 and data bus 16.

Figure 3:
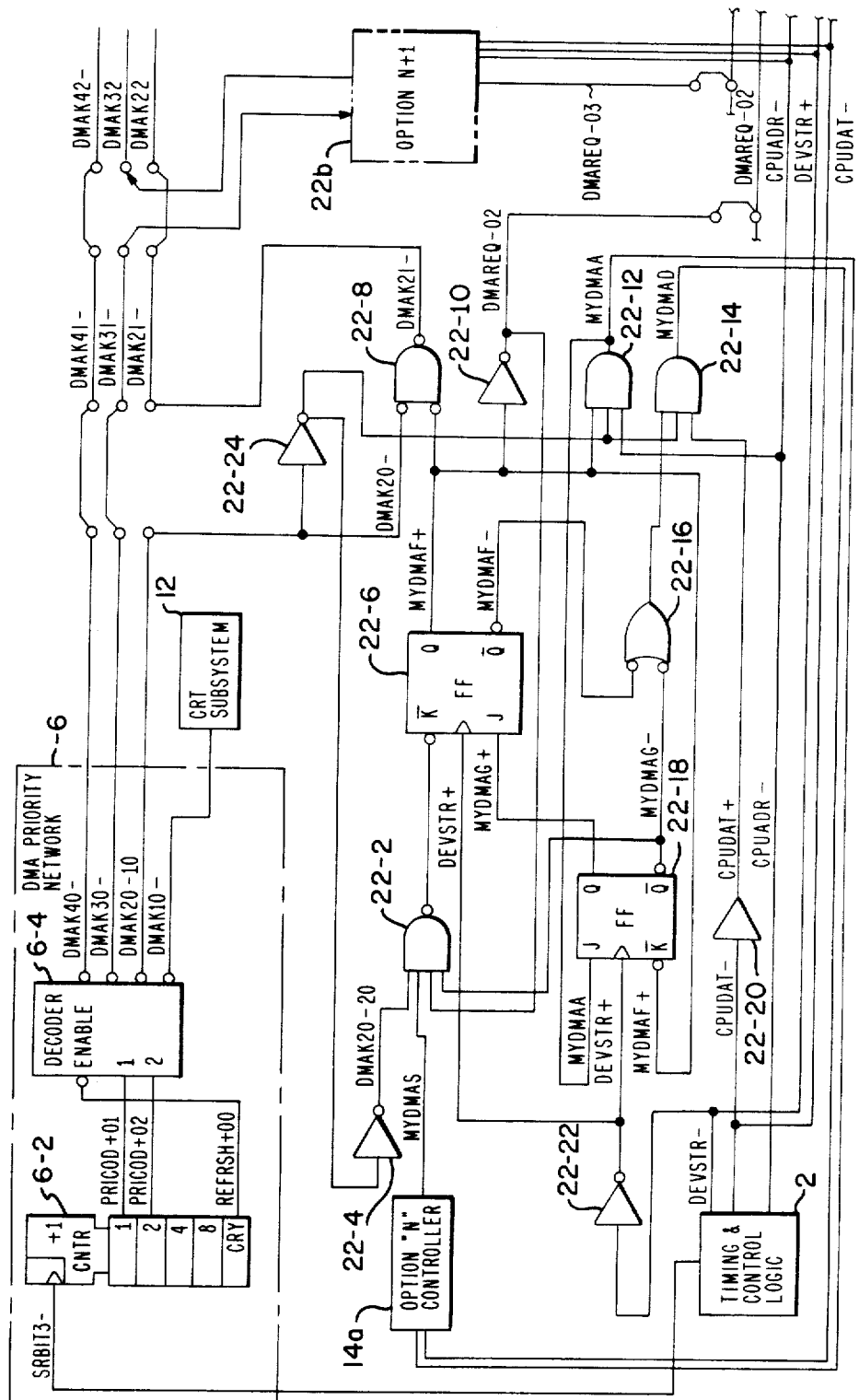
FIG. 3 is a detailed logic diagram of the revolving priority apparatus.

FIG. 3 shows the DMA priority network 6 comprising a free running counter 6-2 and a decoder 6-4 and the DMA linking network 22a.

Counter 6-2 increments by ONE each time the SRBIT3— timing signal goes high. As is obvious to one of ordinary skill in the art, the output signals PR1C0D+01 and PR1C0D+02 indicate a binary count of 00, 01, 10 and 11 on successive positive pulses to the counter 6-2 by timing signal SRBIT3−. Signals PR1C0D+01 and PR1C0D+02 are applied to terminals 1 and 2 of a decoder 6-4 which force output signals DMAK10−, DMAK20−, DMAK30− and DMAK40− on successive SRBIT3− signals. The REFRSH+00 output signal of counter 6-2 is forced high every 16th rise of the SRBIT3− signal. The REFRSH+00 signal is applied to the ENABLE terminal of decoder 6-4 which results in every 4th DMAK10− signal remaining high during the DMA1 time slot. This DMA1 time slot is used to refresh memory 10. The memory refresh operation is not pertinent to the understanding of the invention and is therefore not discussed further.

The option "N" controller requests access to memory 10 by forcing signal MYDMAS, an input to a NAND gate 22-2, high. Option "N" is arbitrarily wired in series with signal DMAK20−10, which is inverted by inverter 22-24 and again by inverter 22-4 and is input to NAND, gate 22-2 as signal DMAK20−20. Signal DMAK20−20 when low defines the DMA2 cycle time. Signal DMAREQ−02 is jumpered to the DMAREQ−02 signal line and is high when no other option connected in series with signal line DMAK20−10 has requested access to memory 10. The DMAREQ−02 signal inputs NAND gate 22-2. The MYDMAG− signal input to NAND gate 22-2 is high. When the 4 inputs to NAND gate 22-2 are high, its output, which is input to the $\overline{K}$ terminal of a flop 22-6, is low. Timing and control logic 2 generates a DEVSTR− strobe signal which is inverted by inverter 22-22. The output signal DEVSTR+ is connected to the clock terminal of flop 22-6, which is set on the rise of signal DEVSTR+. Flop 22-6 can be set on any rise of device strobe DEVSTR+ when the DMAK20−10 signal is high and no other device on the daisy chain requested memory 10 access. Flop 22-6 is a 74S109 JK flop described in "The TTL Data Book for Design Engineers", second Edition, 1976, published by Texas Instruments Inc. The flop 22-6 output signal MYDMAF+ is input to OR gate 22-8 and, when high, forces the signal DMAK21− high, thereby preventing other options responsive to the DMA2 timing cycle from being operative during this DMA2 cycle. Signal MYDMAF+ is inverted by an inverter 22-10 whose output DMAREQ−02 is connected to the DMAREQ−02 bus and to the input of NAND gate 22-2. This signal, when low, prevents the other options responsive to the DMA2 timing cycle from being operative by forcing the output of the NAND gate 22-2 high. (Note that the circuitry described herein is repeated for each option. The DMAREQ−02 is connected to the input of NAND gate 22-2 for each option connected to signal lines DMAK21− and DMAREQ−02.)

The options that are active during a particular DMA cycle are wired in "daisy chain" fashion. Initially, the option wired closest to the DMA priority network 6 has highest priority and the option wired farthest from the DMA priority network 6, that is at the end of daisy chain, has the lowest priority. The output of OR gate 22-8 remaining high prevents lower priority options from access to memory 10 during this DMA2 cycle, and the output of inverter 22-10 high prevents higher priority options from access to memory 10 during this DMA2 cycle.

The DMA20−10 signal is inverted by inverter 22-24 whose output is connected to the input of AND gate 22-12 and AND gate 22-14. Signal MYDMAF+ connects to another input of AND gate 22-12. Address bus 18 timing signal CPUADR− is connected to the third input of AND gate 22-12. The CPUADR− signal, when high, gates the valid DMA address signals on address bus 18. When the 3 inputs to AND gate 22-12 are high, the output signal MYDMAA goes high signalling the option "N" controller 14a to send the memory 10 address on address bus 18. Signal MYDMAF− connects to the input of a NAND gate 22-16, and when low forces the output of NAND 22-16 high. The output of NAND gate 22-16 connects to another input of AND gate 22-14. Data bus 16 timing signal CPUDAT− is generated in timing and control logic 2 and is inverted by inverter 22-20. The output signal CPUDAT+ connects to another input of AND gate 22-14. When the 3 inputs to AND gate 22-14 are high, the output signal MYDMAD goes high signalling the option "N" controller to either send or receive data over data bus 16. Data bus 16 and address bus 18 operation and timing are described in the incorporated application.

The signal MYDMAA+ also connects to the J input of a JK flop 22-18. When strobe signal DEVSTR+, which connects to the clock input, goes high, flop 22-18 sets, forcing the output signal MYDMAG− low. Signal MYDMAG− connects to an input of NAND gate 22-16 and forces the output high to assure that the MYDMAD signal output of AND gate 22-14 remains high until after signal CPUDAT+ goes low.

The MYDMAG+ output signal of flop 22-18 forces the J input of flop 22-6 high. The output of NAND gate 22-2 is also high since the DMAREQ−02 input to NAND gate 22-2 is low. This forces the $\overline{K}$ input of flop 22-6 high, resetting the flop on the next DEVSTR+ signal. Resetting flop 22-6 allows the DMAREQ−02 request line output of inverter 22-10 to go high. Since the MYDMAF flop 22-6 cannot set again until the MYDMAG flop 22-18 resets, another option in the "daisy chain" can request the next DMA2 bus cycle. It may be a requirement that this option access memory 10 on successive DMA2 cycles. In that case, the signal DMAREQ−02 input to NAND gate 22-2 is removed and flop 22-6 can set and access memory 10 during the next DMA2 bus cycle if requested by the option "N" controller 14a signal MYDMAS.

Output signal MYDMAA goes low when flop 22-6 resets since signal MYDMAF+, the input to AND gate 22-12, goes low. This resets flop 22-18 on the next rise of the strobe signal DEVSTR+, since both the J and $\overline{K}$ input signals MYDMAA and MYDMAF+ are low.

Figure 4:
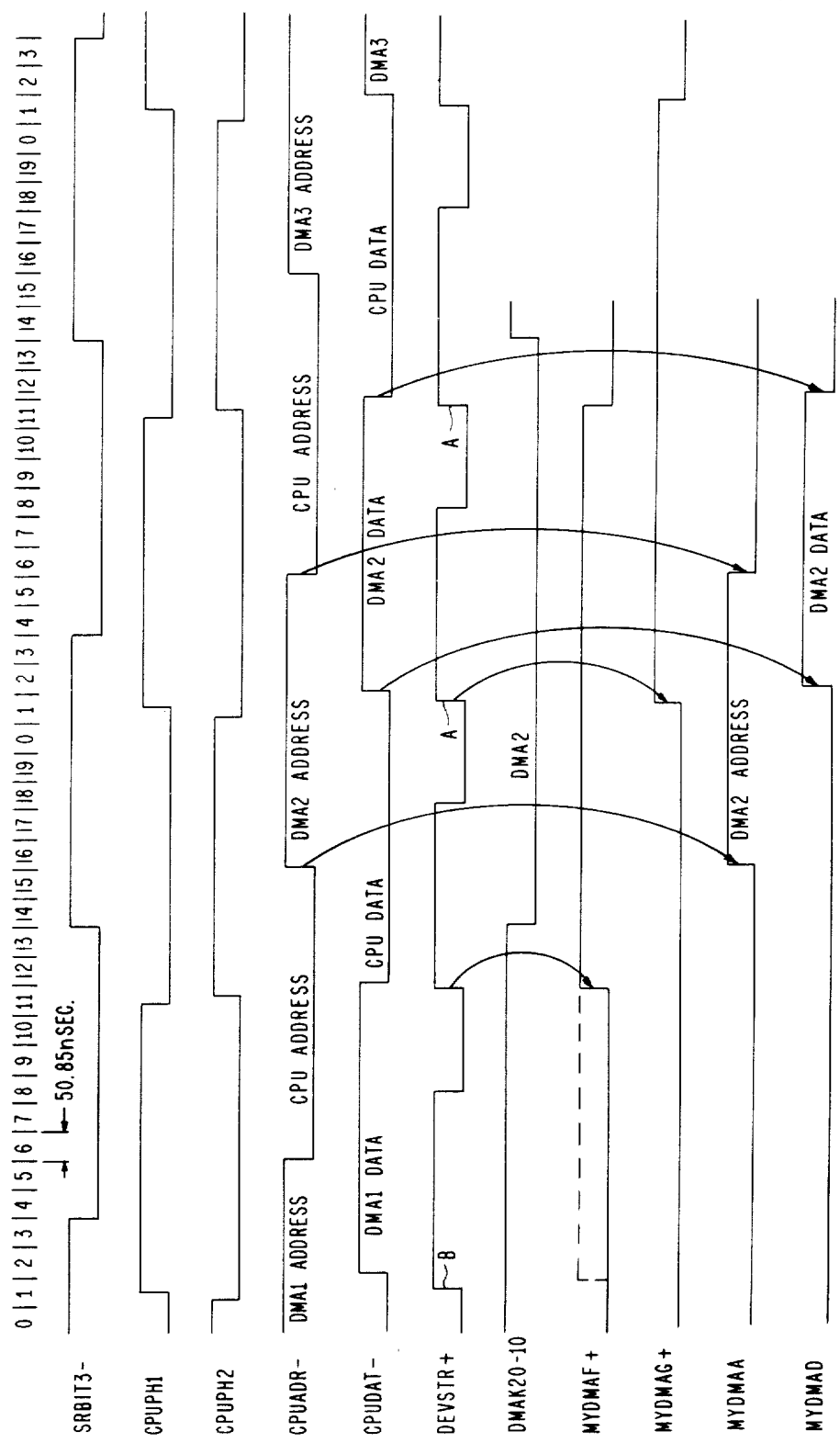
FIG. 4 is a timing diagram of the Direct Memory Access priority logic interacting with system bus signals.

FIG. 4 shows a timing diagram of the DMA priority operation. The CPUPH1 and CPUPH2 signal timings are to show the relationship of the microprocessor subsystem 4 to the DMA cycles. CPUADR− defines the time DMA address signals are on the address bus 18. CPUDAT− defines the time DMA data signals are on the data bus 16. DEVSTR+ times the option devices to the memory 10 timing. Flops set on the rise of the signal.

The above timings are described in detail in the incorporated application. DMAK20−10 defines the DMA2 bus cycle. MYDMAF+ is set on any rise of DEVSTR+ when DMAK20−10 is high. MYDMAG+ is set on the rise of DEVSTR+ when MYDMAF+ is high.

MYDMAA is defined by CPUADR− and MYDMAD is defined by CPUDAT−. Note that MYDMAF+ may go high on any rise of DEVSTR+ with the exception of those marked A. The dotted portion of MYDMAF+ shows the signal going high on the rise of DEVSTR+ marked B.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A terminal system comprising:
    a system bus including an address bus, a data bus and a control bus;
    memory means coupled to said system bus;
    timing means coupled to said control bus for generating timing control signals to divide the timing of said address bus and said data bus into distinct central processing unit (CPU) cycles and a plurality of distinct direct memory access (DMA) cycles and for generating a repeating sequence of a plurality of distinct DMA signals on said control bus, each of said plurality of DMA signals in a first state corresponding to one of said plurality of distinct DMA cycles and indicating the occurrence of said corresponding DMA cycle;
    a plurality of peripheral subsystems coupled to said system bus for transferring data to and from said memory means, each of said plurality of peripheral subsystems having jumper means for coupling to a selected one of said plurality of distinct signals for transferring data signals during the distinct DMA cycle corresponding to said one of said plurality of DMA signals, at least one of said plurality of DMA signals having a plurality of common cycle peripheral subsystems coupled thereto in a daisy chain fashion, each of said plurality of common cycle peripheral subsystems coupled to said at least one of said plurality of DMA signals having priority resolution means for determining that said one of said plurality of common cycle peripheral subsystems may be granted access to said system bus for transferring said data signals between said memory subsystem and said one of said plurality of common cycle peripheral subsystems, and having requesting means for requesting access to said system bus, said priority resolution means and said requesting means being coupled in a first mode of operation to enable said one of said plurality of commmon cycle peripheral subsystems to retain access to said system bus on successive ones of said corresponding DMA cycles despite requests for access from others of the plurality of common cycle peripheral subsystems, and
    being coupled in a second mode of operation to enable another one of said plurality of common cycle peripheral subsystems requesting a data transfer to obtain access to said system bus on a subsequent one of said corresponding DMA cycles and, by response of the priority resolution means of said one of said plurality of common cycle peripheral subsystems to a request for access by said another one of said plurality of common cycle peripheral subsystems, prevent said one of said plurality of common cycle peripheral subsystems from retaining access to said system bus.

2. The system of claim 1 wherein said timing means comprises:
    generating means coupled to said control bus and generating a repeating sequence of a first timing signal, repeating sequence of a data timing signal and a repeating sequence of an address timing signal;
    counter means coupled to said control bus and responsive to said repeating sequence of said first timing signal for generating a plurality of counting signals; and
    decoder means coupled to said counter means and responsive to said plurality of counting signals for generating said repeating sequence of said plurality of DMA signals on said control bus.

3. The system of claim 2 wherein each of said CPU cycles as indicated by said repeating sequence of said data and said address signals is followed in time by one of said plurality of DMA cycles as indicated by a corresponding one of said plurality of DMA signals in said first state.

4. The system of claim 3 wherein said control bus comprises:
    a plurality of DMA request signals, each of said plurality of DMA request signals corresponding to one of said plurality of DMA signals, the requesting means of a first plurality of peripheral subsystems being coupled in common by said jumper means to a first of said plurality of DMA request signals to request access to the system bus.

5. The system of claim 4 where first and second of said peripheral subsystems comprise:
    a first peripheral controller in said first peripheral subsystem coupled to said system bus and generating a first device request signal when said first peripheral controller requires that data be transferred between said first peripheral controller and said memory means; and
    a first data link synchronizer in said first peripheral subsystem coupled to said system bus and to said first peripheral controller and having a first of said priority resolution means responsive to said first device request signal and said one of said plurality of DMA signals during said first mode of operation for generating a first priority signal in a first state, a first of said requesting means being responsive to said first priority signal in said first state for generating said one of said plurality of DMA request signals in a first state, a second priority resolution means of said second of said peripheral subsystems being responsive to a second device request signal from a second peripheral controller and said one of said plurality of DMA request signals in said first state for generating a second priority signal in a second state for preventing access to said system bus as long as said first of said peripheral subsystems requests access to said system bus.

6. The system of claim 5 wherein each of said peripheral subsystems comprises:
    said peripheral controller coupled to said system bus and generating said device request signal when said peripheral controller requires that data be transferred between said peripheral controller and said memory means;
    said data link synchronizer coupled to said system bus and to said peripheral controller and having said priority resolution means responsive to said device request signal, said one of said plurality of DMA signals and said one of said plurality of DMA request signals in a second state corresponding to said one of said plurality of DMA signals during said second mode of operation for generating said priority signal;

said requesting means being responsive to said priority signal for generating said one of said plurality of DMA request signals in said first state;

said priority resolution means of one of said each of said peripheral subsystems acquiring access to said system bus during a first cycle of said one of said plurality of DMA signals being responsive to said one of said plurality of DMA signals in said first state for preventing access to said system bus of said one of said each of said peripheral subsystems during a second cycle of said one of said plurality of DMA signals, and said priority resolution means of a remainder of said each of said peripheral subsystems being responsive to said one of said plurality of DMA request signals in said first state for preventing acces to said system bus of said remainder of said each of said peripheral subsystems during said first cycle.

* * * * *